United States Patent [19]

Kohzai et al.

[11] 4,364,005

[45] Dec. 14, 1982

[54] BRUSHLESS TACHOMETER GENERATOR

[75] Inventors: Yoshinori Kohzai, Hino; Yoichi Amemiya, Hachioji; Yoshiki Fujioka; Noboru Iwamatsu, both of Hino, all of Japan

[73] Assignee: Fujitsu Fanuc Limited, Tokyo, Japan

[21] Appl. No.: 169,428

[22] Filed: Jul. 16, 1980

[30] Foreign Application Priority Data

Jul. 19, 1979 [JP] Japan .................................. 54/99613

[51] Int. Cl.³ ........................ H02P 9/00; H02K 21/12
[52] U.S. Cl. .................................... 322/31; 310/156; 310/DIG. 3; 322/94; 322/DIG. 5
[58] Field of Search ............. 322/8, 29, 31, 89, 90–95, 322/DIG. 5; 310/156, 85, DIG. 3; 318/328

[56] References Cited

U.S. PATENT DOCUMENTS

| | | | |
|---|---|---|---|
| 3,039,040 | 6/1962 | Angus et al. | 322/95 X |
| 3,165,685 | 1/1965 | Manteuffel et al. | 310/DIG. 3 |
| 3,508,137 | 4/1970 | Hill | 322/8 X |
| 3,603,869 | 9/1971 | Neuffer et al. | 322/90 X |
| 4,110,676 | 8/1978 | Edick et al. | 322/DIG. 5 |

Primary Examiner—R. J. Hickey
Attorney, Agent, or Firm—Staas & Halsey

[57] ABSTRACT

A tachometer generator comprising a generator section for producing rectangular polyphase alternating voltages having a peak value which is proportional to the speed of the rotor, and a commutator section including contactless change-over switches for successively transferring the alternating voltages from the generator section, and sensors for producing switching signals which actuate the change-over switches in accordance with the rotational position of the rotor of the generator section. In the commutator section the sensors are equivalent in number to the change-over switches and comprise Hall devices arrayed about a rotary shaft which is coupled to the generator section. The alternating voltages which are obtained successively from the coils of the generator section as the rotary shaft rotates, are transferred in order by the change-over switches to produce a speed signal, in analog form; which is proportional to the rotating speed of the rotor. The axially extending width of the rotor is smaller than the axially extending width of the stator, the width of the rotor being approximately 80% that of the stator. A magnetic shield plate is interposed between the generator section and the sensors of the commutator section. The tachometer generator having the above arrangement generates more accurate speed signals and can be reduced in size since the generator and commutator sections are capable of being disposed closer together as a result of the provision of the magnetic shield.

7 Claims, 6 Drawing Figures

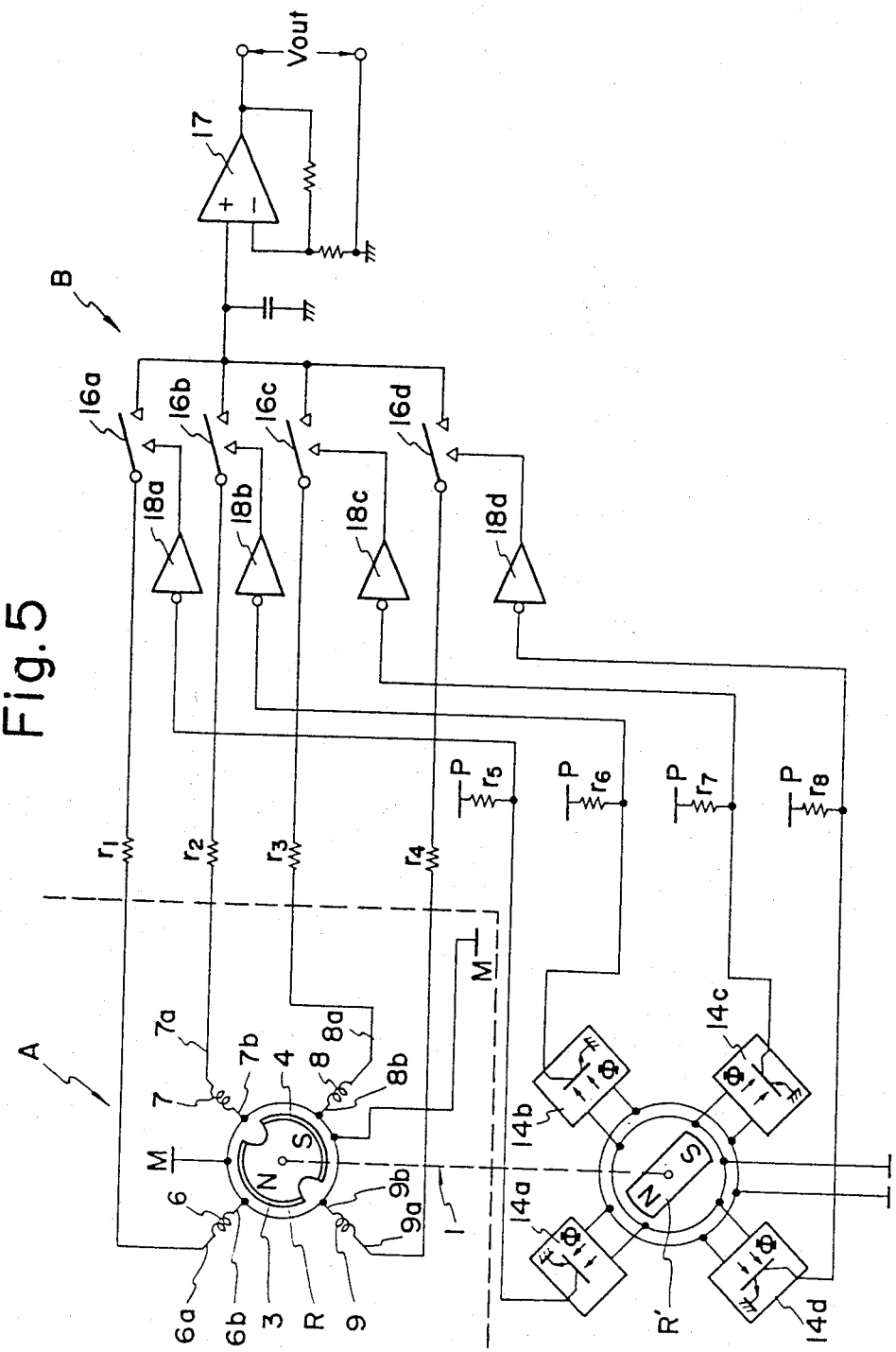

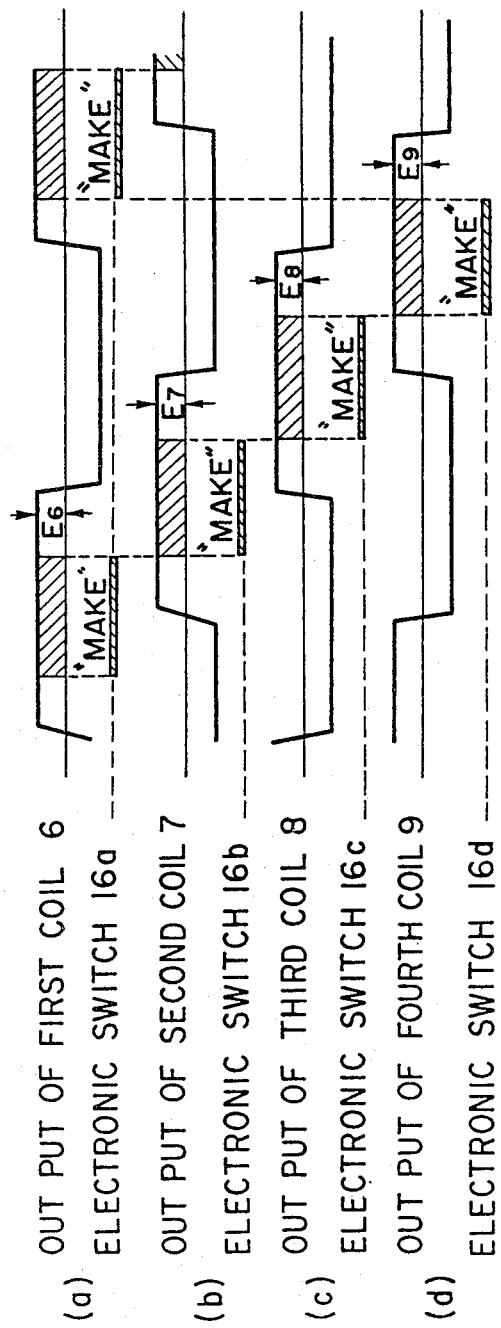

4,364,005

BRUSHLESS TACHOMETER GENERATOR

BACKGROUND OF THE INVENTION

This invention relates to a brushless tachometer generator.

A number of methods and devices, which rely upon closed loop automatic control systems, have been proposed and put into use for the control of various DC motors. In order to maintain a prescribed speed at a high level of precision it is necessary with all of these methods and devices to effect automatic control in such a manner that the speed of the DC motor is detected accurately and made to conform to a certain set value. It is conventional practice to employ only DC tachometer generators to detect the speed of the DC motor, in order to provide good linearity. On the other hand, because induction motors are simple in construction, durable and require little maintenance, particularly induction motors of the squirrel-cage type, methods have been developed in which closed loop automatic control systems are applied to such motors to control their speed. However, DC tachometer generators are employed even in these induction motor speed-control systems in order to detect the motor speed. These DC tachometer generators generally employ a brush and commutator system and require the expenditure of great amounts of labor for maintenance and inspection. In a speed control system for a squirrel-cage induction motor, an exorbitant amount of time is required just for the maintenance and inspection of the brush- and commutator-type DC tachometer generator itself. Accordingly, tachometer generators have recently been used in which a permanent magnet is adopted as a rotor and polyphase alternating currents are generated and then rectified by various methods using a contactless system, with the resulting DC output being utilized as a speed signal. For various reasons, one being the desire for a large output, the rotor is designed to have a width which is approximately equal to that of the stator so that, owing to the effects of coil end flux leakage, a variance occurs in the peak value of the output voltage generated in the coils. As a result, the tachometer generators of the type described cannot assure a high level of precision because of a ripple which exists in the DC output.

Another problem is associated with a Hall device which is employed at a portion of the set-up that detects a commutator switching operation. Specifically, with the conventional apparatus, the commutator section and generator section must be remote from each other so that the Hall device will not be affected by the flux leaking from the generator. The unfortunate result is that the length of the tachometer generator along its axis of rotation becomes quite large.

SUMMARY OF THE INVENTION

Accordingly, it is an object of the present invention to provide a brushless tachometer generator which includes an AC generator section, wherein the precision of the obtained speed signals is enhanced by reducing the influence of the magnetic flux which leaks from the generator section.

It is another object of the present invention to provide a brushless tachometer generator which includes an AC generator section, wherein the axial length of the tachometer generator can be kept to a minimum.

It is a further object of the present invention to provide a brushless tachometer generator which includes an AC generator section and Hall devices which are located at a portion for generating the switching signals of a commutator section, wherein the axial length of the tachometer generator can be kept to a minimum without the Hall devices being influenced by the magnetic flux which leaks from the generator section.

In one aspect of the present invention, the tachometer generator includes a generator section provided with a yoke having coils, the yoke also serving as a stator, and with a rotor comprising a permanent magnet formed in such a manner that the width of the rotor along its axis of rotation is smaller than the width of the yoke along the longitudinal axis of rotation thereof. Tachometer generator also includes a commutator section provided with change-over switches for successively transferring the AC outputs generated by the generator section, and provided with sensors for detecting the rotational position of the rotor shaft and for producing control signals for controlling the change-over switches. The output voltage from each coil of the generator section is transferred by the change-over switches in response to the output signals from the sensors, thereby providing an output voltage which is proportional to the speed of the rotor.

In another aspect of the present invention, the tachometer generator is further provided with a magnetic shield disposed between the sensor and the generator sections, and the sensors make use of a Hall devices.

Other features and advantages of the present invention will be apparent from the following description taken in conjunction with the accompanying drawings.

BRIEF DESCRIPTION OF THE DRAWINGS

FIG. 5 is a circuit diagram illustrating an embodiment of the present invention; and FIG. 6 is a waveform diagram of output signals associated with the various portions of the tachometer generator of the present invention.

DETAILED DESCRIPTION OF THE PREFERRED EMBODIMENT

Figure 1:
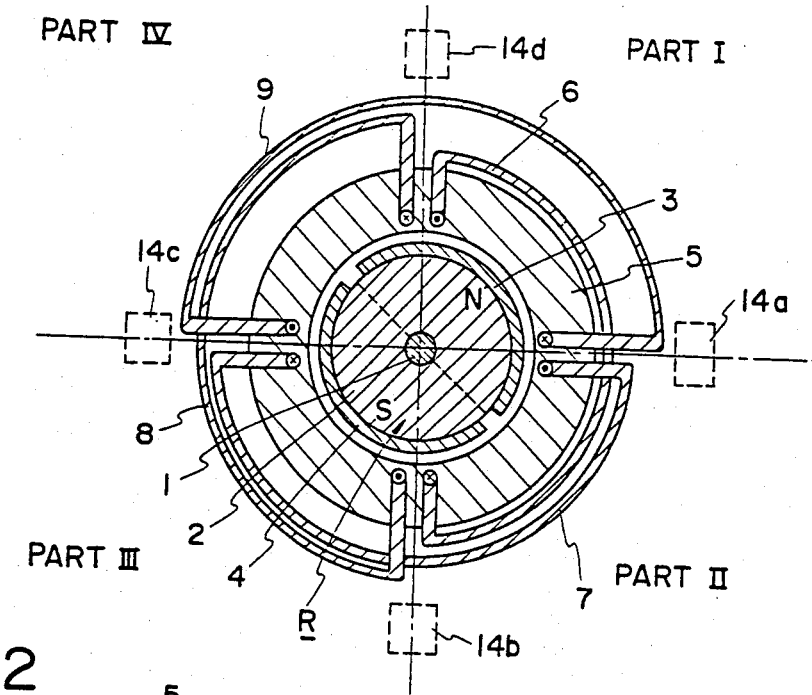
FIG. 1 is a schematic view showing the structure of a generator section.
Figure 2:
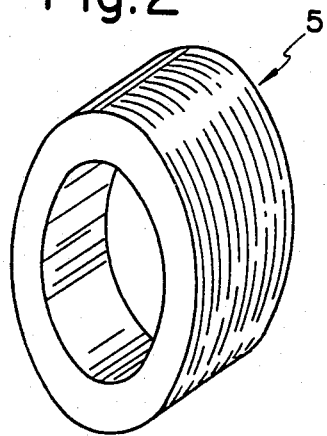
FIG. 2 is a perspective view of a yoke which also serves as a stator.
Figure 3:
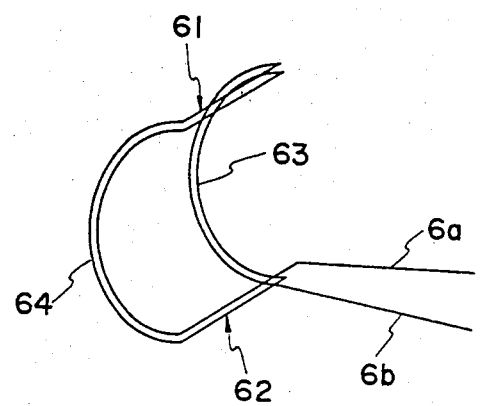
FIG. 3 is a perspective view showing the arrangement of a coil in simplified form.

The generator section of a tachometer generator in accordance with the present invention is illustrated in FIG. 1. The generator section A includes a rotary shaft 1 which is coupled directly or through a gear mechanism to the rotary shaft of an induction motor, the speed of which is to be detected. Mounted on the rotary shaft 1 is a permanent magnet 2 having pole shoes 3, 4 attached to the ends of its north and south poles, respectively. The permanent magnet 2 and pole shoes 3, 4 form a rotor R. A yoke 5 which serves also as a stator, and which will be referred to hereinafter as a stator and yoke, is provided about the outer circumference of the rotor R. The stator and yoke 5 is circular in shape and is constructed by laminating a number of thin silicon steel plates which have been punched into circular form. Bonded onto the inner face of the stator and yoke 5 are four coils which are displaced from one another by 90°. Specifically, a first coil 6 is provided on the inner face of stator and yoke 5 over parts I and II thereof to form a first magnetic pole. The coil 6 is illustrated in greater detail in FIG. 3 and has coil portions 61, 62 which are bonded to the inner face of the stator and yoke 5, connecting portions 63, 64 which interconnect the coil portions 61, 62, and wire leads 6a, 6b. For the sake of simplicity the coil shown in FIG. 3 has only two turns; the actual number is much larger. A second coil 7 is wound over parts II and III of the stator and yoke 5 to form a second fixed magnetic pole, a third pole 8 is wound over parts III and IV to form a third fixed magnetic pole, and a fourth coil 9 is wound over parts IV and I to form a fourth fixed magnetic pole. The coils 7, 8, 9 are wound in the same manner as coil 6 and have the same configuration. In FIG. 1 the connecting portions of the coils are exaggerated for the sake of simplicity. The stator and yoke 5 wound with the coils in combination with the rotor R form a generator member A.

Figure 4:
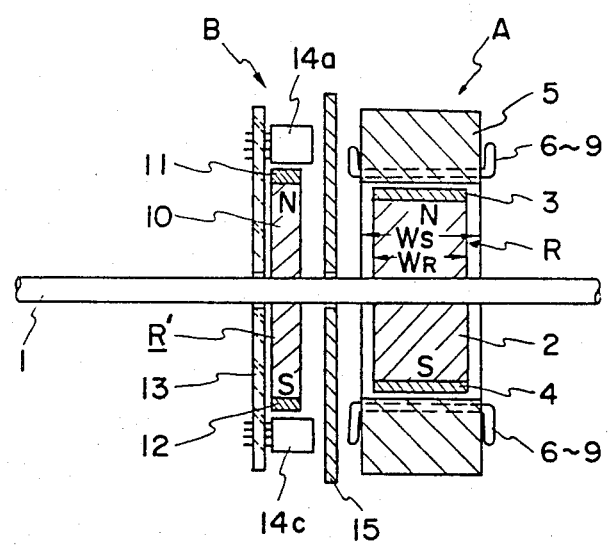
FIG. 4 is a cross-sectional view of an embodiment of the present invention.

Shown in FIG. 4 is a cross-sectional view of the tachometer generator of the present invention. A denotes the generator section, and B denotes a commutator section which will be described later. It will be appreciated from FIG. 4 that the width of rotor R, namely its width $W_R$ longitudinally of the rotary shaft 1, is smaller than the width $W_S$ of the stator and yoke 5. In the present embodiment, $W_R$ and $W_S$ are related by the equation $W_R = 0.8 W_S$. The rotor R is disposed within the stator and yoke 5 in such a manner that its left and right sides are equally spaced from the left and right sides of the stator and yoke 5.

The commutator section B, shown in FIG. 4, has a rotor R' comprising a permanent magnet 10 which is mounted on the rotary shaft 1, and pole shoes 11, 12 attached to the ends of the north and south poles, respectively, of the permanent magnet. A printed circuit board 13 is fixedly secured to a housing, which is not shown, and has four sensors 14a, 14b, 14c, 14d mounted on it. The sensors are disposed for corresponding ones of the coils 6, 7, 8 and 9, as shown in FIG. 1. In FIG. 4, however, only the sensors 14a, 14c are shown. A magnetic shield plate 15, which consists of a magnetic body, is interposed between the generator section A and the commutator section B.

A circuit diagram of the tachometer generator of the present invention is shown in FIG. 5. Electronic switches 16a, 16b, 16c and 16d are opened or closed under the control of signals from the sensors 14a, 14b, 14c and 14d, respectively. The output terminal of each electronic switch is connected to the input side of a buffer amplifier 17. Inverters 18a, 18b, 18c and 18d are provided for corresponding ones of the electronic switches. Each of the sensors 14a through 14d includes a Hall device and a switching element which is switched thereby. In particular, a switching element is closed in response to a signal generated by the corresponding Hall device when the Hall device detects a magnetic flux, and is opened when the Hall device detects that the magnetic flux has vanished. The switching elements are normally in the open state. The electronic switches 16a through 16d employ either bipolar transistors or field-effect transistors and are rendered conductive when the outputs of the corresponding inverters 18a through 18d go high, or non-conductive when these outputs go low. The rotor R', sensors 14a, 14b, 14c, 14d, and electronic switches 16a, 16b, 16c, 16d form the commutator section B.

The tachometer generator having the above construction operates as follows. As the rotary shaft 1 rotates, the coils 6, 7, 8, 9 generate alternating voltage displaced in phase by 90° relative to one another. In FIG. 6, a denotes the waveform of the voltage generator across the terminals 6a, 6b of coil 6, b the waveform of the voltage generated across the terminals 7a, 7b of coil 7, c the waveform of the voltage generated across the terminals 8a, 8b of the coil 8, and d the waveform of the voltage generated across the terminals 9a, 9b of coil 9. The frequency and peak values $E_6$, $E_7$, $E_8$, $E_9$ of the generated voltages are proportional to the rotational speed of the rotary shaft 1. The permanent magnet which constitutes the rotor R' of the commutator section B actuates each of the Hall devices as it rotates along with the rotary shaft 1, and each Hall device responds by sending a signal to the corresponding electronic switch. Accordingly, the electronic switches 16a through 16d are closed in succession by the arriving signals, one switch closing each time the rotary shaft revolves through 90°. As each electronic switch closes it transfers to the input side of the buffer amplifier 17 the voltage developed in the corresponding coil of the generator section A. Thus, the buffer amplifier 17 provides at its output a DC analog signal, serving as a speed detection signal, having a magnitude which is proportional to the speed of the rotary shaft 1.

It should be noted that the number of output phases from the generator section A is not limited to the number employed in the foregoing embodiment. Thus, n phases may be adopted, where n is at least 3.

In accordance with the present invention as described and illustrated above, a rotor having a width which is less than that of a stator and yoke member is disposed within the stator and yoke member by equal distances from either side thereof. This is so that the flux from the rotor crosses the coil portions uniformly wound on the inner face of the stator and yoke member without any influence from the flux leaking from the portions of the coil ends (the connecting portions), which bulge out from the sides of the stator pole and yoke. As a result, the output voltages from the coils have uniform waveforms so that the speed detection signal from the buffer amplifier has an extremely small ripple component. Furthermore, the magnetic shield interposed between the generator and commutator sections obstructs the magnetic flux leaking from the generator portion and prevents the flux from reaching the commutator section. Accordingly, the generator and commutator sections can be disposed closer together than has hitherto been possible, thereby allowing the longitudinal dimension of the apparatus to be diminished by a wide margin.

As many apparently widely different embodiments of the present invention may be made without departing from the spirit and scope thereof, it is to be understood that the invention is not limited to the specific embodiments thereof except as defined in the appended claims.

What we claim is:

1. A tachometer generator comprising:
   a generator section comprising:
   a stator pole and yoke member having at least three coils fixed thereon;
   a rotary shaft; and
   a rotor mounted on the rotary shaft, said rotor comprising a permanent magnet, the axially extending width of said rotor being less than the axially extending width of said stator pole and yoke member; and a commutator section comprising:
  at least three sensors for detecting the rotational position of the rotary shaft and for emitting first, second and third control signals;
  at least three change-over switches operatively connected to said at least three coils, said at least three change-over switches all being connected at an output terminal for successively transferring, to the output terminal, alternating output voltages supplied by said at least three coils, said at least three change-over switches being controlled by said first, second and third control signals;
  a magnetic shield plate interposed between said generator section and said commutator section, whereby
  an output voltage, which is proportional to the speed of the rotor, is provided at the output terminal.

2. A tachometer generator according to claim 1, wherein the axially extending width of said rotor of the generator section is equal to the axially extending width of said stator pole and yoke member multiplied by 0.8.

3. A tachometer generator according to claim 1 or 2, wherein each of said at least three sensors comprises a Hall device.

4. A tachometer generator for measuring the speed of a rotary shaft, comprising:
  a generator section comprising:
    a rotor, comprising a permanent magnet, mounted on the rotary shaft; and
    a stator and yoke member having first, second and third coils affixed thereon, said first, second and third coils generating first, second and third alternating voltages in dependence upon the rotation of said rotor, the axially extending width of said rotor being less than the axially extending width of said stator and yoke member;
  a commutator section, having an output terminal, comprising:
    first, second and third sensing means for detecting the rotational position of the rotary shaft and for generating first, second and third control signals, respectively;
    first switch means, operatively connected to the output terminal, said first coil and said first sensing means, for providing said first alternating voltage at the output terminal in dependence upon said first control signal;
    second switch means, operatively connected to the output terminal, said second coil and said second sensing means, for providing said second alternating voltage at the output terminal in dependence upon said second control signal; and
    third switch means, operatively connected to the output terminal, said third coil and said third sensing means, for providing said third alternating voltage at the output terminal in dependence upon said third control signal, whereby the voltage at the output terminal is proportional to the speed of the rotor; and
  a magnetic shield plate positioned between said generator section and said commutator section, said magnetic shield plate preventing flux, which leaks from said generator section, from reaching said commutator section.

5. A tachometer generator as set forth in claim 4, wherein the axially extending width of said rotor is 0.8 of the axially extending width of said stator and yoke member.

6. A tachometer generator as set forth in claim 5, wherein each of said first, second and third sensing means comprises a Hall device.

7. A tachometer generator as set forth in claim 6, wherein said stator and yoke member comprises a plurality of thin silicon steel plates laminated together, wherein each of said plurality of thin silicon steel plates has been punched into a circular form.

* * * * *

UNITED STATES PATENT AND TRADEMARK OFFICE
CERTIFICATE OF CORRECTION

PATENT NO. : 4,364,005
DATED : DECEMBER 14, 1982
INVENTOR(S) : YOSHINORI KOHZAI ET AL.

It is certified that error appears in the above-identified patent and that said Letters Patent is hereby corrected as shown below:

```
Front page [30] Foreign Application Priority Data,
                "54/99613" should be --54/99618--;
           [57] Abstract, col. 2, line 16, after
                "form" change ";" to --,--.
Col. 1, line 30, "exorbitant" should be --exhorbitant--.
Col. 2, line 30, "a Hall devices" should be --Hall devices--.
Col. 4, line 5, "a" should be --a--;
        line 6, "b" should be --b--;
        line 8, "c" should be --c--;
        line 9, "d" should be --d--;
        line 30, "n" should be --n--;
        line 31, "n" should be --n--.
Col. 5, line 14, after "signals;" insert --and--.
```

Signed and Sealed this

Thirty-first Day of May 1983

[SEAL]

Attest:

DONALD J. QUIGG

Attesting Officer     Acting Commissioner of Patents and Trademarks